2,903,439
Patented Sept. 8, 1959

2,903,439

SYNTHETIC RUBBERS REINFORCED WITH SILICEOUS PIGMENTS

Ralph F. Wolf, Akron, Ohio, assignor to Columbia-Southern Chemical Corporation, Allegheny County, Pa., a corporation of Delaware No Drawing. Application January 5, 1956
Serial No. 557,437

10 Claims. (Cl. 260—23.7)

This invention relates to the production of rubber compositions having improved physical properties. In particular, the present invention is concerned with improvement of rubber compounds having relatively high permanent set. It has been the bane of rubber compounders that Butyl rubbers containing siliceous fillers or pigments as reinforcing agents manifest a very undesirable high permanent set. This characteristic is particularly annoying to automobile manufacturers employing Butyl rubber stock in various automotive items, since once the rubber has been stretched in any direction it does not rebound to its original state. Obviously, a gasket of this rubber is very poor after undergoing physical stresses.

Also, it has been known that the permanent set of Butyl rubber reinforced with siliceous pigments is manifestly higher than that of Butyl rubber reinforced with carbon black pigments.

The term "Butyl rubber" is intended to include polymers of isobutylene and copolymers of isobutylene and a diolefin of the group consisting of butadiene, isoprene, dimethyl butadiene, pentadiene, cyclopentadiene and piperylene, such as are described in U.S. Patent No. 2,442,068. Such polymers normally contain 70 to 99 percent by weight of the isobutylene and 30 to 1 percent by weight of the diolefin. The copolymers are produced by a low temperature polymerization, for example, at a temperature of substantially minus 95° C.

According to the present invention it has been found that the high permanent set of Butyl rubber reinforced with siliceous pigments may be reduced substantially, usually at least one-third. A vulcanizate of a synthetic rubber-like polymer of isobutylene has been prepared, according to the present invention, comprising a siliceous reinforcing pigment and sulfurized tall oil. Tall oil is a by-product of the manufacture of paper pulp; it is an acidic material chiefly comprised of rosin acids and fatty acids, roughly in equal proportions. From about 1 percent to about 25 percent of sulfur may be added to the tall oil and the mixture heated between about 120° C. and 250° C., preferably between 140° C. and 180° C. or 200° C.

Sulfurized tall oil products may be prepared from crude tall oil by heating the tall oil with 10 percent of sulfur at a temperature of 160° C. for 4 hours. As another example, refined tall oil may be used to prepare the sulfurized product. Tall oil refined by distillation and separation of the crystallizable part of the rosin constituents, the liquid portion then being treated with 5 percent sulfur at a temperature of 140° C. for one and one-half hours, may be used.

Sulfurization of tall oil according to the procedures referred to above yields a product which is more or less viscous and of sticky character.

A particularly good sulfurized tall oil for use in the present invention is a viscous brown, non-toxic liquid sold under the trade name "Fortex" by Thermoid Chemical Company, Trenton, New Jersey.

Siliceous reinforcing pigments which may be used in accordance with the present invention are finely divided pulverulent materials containing in excess of about 55 to 60 percent $SiO_2$ by weight on the water-free basis and having an average ultimate particle size below 0.1 micron, preferably in the range of 0.01 to 0.05 micron. Typical pigments of this character are finely divided silica, calcium silicate, magnesium silicate, sodium aluminum silicate, sodium calcium aluminum silicate, aluminum silicate, and the like.

Siliceous pigments particularly suitable for the present invention may be prepared in several ways. Thus, finely-divided silica in pigmentary form having a surface area in the range of 25 to 250 square meters per gram and an average ultimate particle size below 0.1 micron may be prepared by a precipitation method which involves reacting an aqueous solution of an alkali metal silicate such as sodium silicate with an acid. By carefully controlling the concentration of the reactants, the temperature conditions, rate of addition of acid, etc., as herein contemplated, it is possible to precipitate a product having finely-divided, discrete particles as compared to the gel resulting from processes commonly known in the art.

This precipitation method consists, more particularly, in adding an acid to alkali metal silicate having a predetermined concentration. It is at times advantageous that the alkali metal silicate contain a certain concentration of sodium chloride or other alkali metal salt admixed therewith. The acid is added to the silicate solution since the rate of neutralization of the alkali metal silicate is important. For instance, were the silicate solution to be added to an excess of acid, the former would be neutralized too rapidly and the conventional gel would be produced. The rate of admixing the acid with the silicate solution is determined by several factors.

Thus, where a solution of $Na_2O(SiO_2)_{3.3}$ containing 28 grams of $SiO_2$ per liter and 20.7 grams per liter of NaCl is treated with carbon dioxide at 25° C., the product has a surface area of 344 square meters per gram when the slurry is carbonated to a pH of 7 in 20 minutes. On the other hand, when this time of acidification is increased to 1440 minutes, the surface area falls to 166, a more desirable surface area. Moreover, by increasing the NaCl content to 53.9 grams per liter, a pigment having a surface area of 112.5 square meters per gram can be obtained with only 20 minutes of acidification at 25° C. Thus, the rate of acidification may range from 5 to 2880 minutes or longer, so long as the other conditions are properly adjusted.

The surface areas mentioned herein are measured by the Brunauer-Emmett-Teller (B.E.T.) method which is described in the Journal of the American Chemical Society, volume 60, page 309 (1938).

When the alkali metal silicate used in preparing a finely divided pigment is sodium silicate, it should normally have the composition $Na_2O(SiO_2)_x$, where $x$ is at least 2, usually 2 to 4, including fractional numbers, preferably in the range of 3 to 4. The silicate solution generally contains 10 to 100 grams of $SiO_2$ per liter.

The rate of acid addition is important, as previously stated, and is dependent upon the concentration of the other reactants. Precipitation usually begins after about 30 percent of the acid required to react with the $Na_2O$ content of the alkali metal silicate and produce the sodium salt has been added and is usually complete after 50 to 70 percent of the theoretical amount of acid has been added. Any convenient rate may be employed to neutralize the remaining acidic material when precipitation has ceased. Although it has been found preferable to conduct the acidification of the silicate using carbon dioxide or an acid salt thereof, such as sodium bicarbonate, other acids which may be used include: hydrochloric acid, sulfuric acid, phosphoric acid, sulfurous acid, nitric acid, as well as the acid or partially neutralized alkali metal salts of such acids, such as sodium bicarbonate, ammonium bicarbonate, sodium acid sulfate, disodium acid phosphate, and the like.

Precipitated silica having the properties set forth above may be prepared by still another method. Thus, by reacting a finely divided alkaline earth metal silicate, such as calcium silicate, having an average ultimate particle size below 0.1 micron, with an acid having an anion which forms a water soluble salt with the alkaline earth metal, a siliceous pigment particularly useful for the present invention is prepared.

In the preparation of this pigment, calcium silicate in an aqueous medium is treated with sufficient acid to decompose it, leaving a maximum of 6 percent calcium in the silica pigment, the calcium being computed as CaO. Proper concentrations of CaO in the resulting product may be achieved by reducing the pH of the aqueous calcium silicate solution to below about 5, usually in the range of 3 to 5. Inasmuch as the silica produced by the process just described is present in a slurry and is difficult to recover therefrom because it does not settle or filter rapidly, it has been found expedient to increase the pH of the slurry above 5, usually in the 7 to 8.5 range. The increase in pH affords a twofold benefit in that it facilitates separation and recovery by settling and/or filtration of the silica and it decreases the surface area to a more practical and desirable surface area. The pH may be increased by adding an alkali, such as sodium hydroxide or other like alkali metal hydroxide, to the resultant slurry.

Calcium silicates having an average ultimate particle size below 0.1 micron are best prepared by reacting calcium chloride with alkali metal silicate in aqueous medium containing sodium chloride or like alkali metal chloride. The sodium chloride conveniently may be in the calcium chloride solution although it may also be in the sodium silicate solution. Thus, it is found most desirable to react aqueous sodium silicate with an aqueous calcium chloride solution containing sodium chloride, preferably in the proportion of at least 0.1 pound, and usually in the range of 0.2 to 0.5 pound, of sodium chloride per pound of calcium chloride. It has been found that the presence of sodium chloride materially improves the character of the pigment. Although a wide range of concentrations of the alkali metal silicate and the calcium chloride solutions may be employed, excellent pigments result when a sodium silicate solution containing in excess of 20 grams of $SiO_2$ per liter, usually in the range of 50 to 150 grams of $SiO_2$, and a calcium chloride solution containing at least 20 grams of calcium chloride per liter, usually in the range of 50 to 150 grams per liter, are used.

The amount of calcium chloride is generally in stoichiometric excess of the sodium silicate. Although a slight excess of sodium silicate is tolerable, it is best to have at least a stoichiometric amount of calcium chloride present during the reaction.

Another important factor in this reaction is the mode of mixing the reactants, since it is very desirable that the reactants be thoroughly intermixed. An efficient method for accomplishing this high degree of intermixing is to introduce the aqueous streams into a centrifugal pump, thereby creating an excellent turbulence at the point of mixing. Better agitation is realized if the pump is not operated to capacity. If, for instance, the pump is capable of discharging 100 gallons per minute with unlimited flow of liquid to the pump, the amount of reacting solution supplied to the pump is held at least 10 percent below, and usually 35 percent or more below, this amount. By so doing, not only is better mixing accomplished, but the character of the resulting calcium silicate is improved.

To insure production of the calcium silicate in a highly finely divided state, alkali metal silicate having the composition $Na_2O(SiO_2)_x$, where $x$ is a number not less than 2 nor more than 4, is preferably used. This results in the production of a calcium silicate having a composition $CaO(SiO_2)_x$, where $x$ is as defined above. However, other calcium silicates wherein $x$ is higher or lower may be used in certain cases. When calcium silicate prepared in the fashion just described is treated with a mineral acid, in the manner disclosed above, a dry, powdered silica in extremely fine state of division is produced. This silica normally contains about 75 percent $SiO_2$, the usual range being about 78 to 88 percent $SiO_2$.

The siliceous pigments produced by the methods hereinabove described contain "bound water" and "free water." The term "free water" denotes water which may be removed from the silica pigment by heating the pigment at a temperature of 105° C. for a period of 24 hours in a laboratory oven. The term "bound water" is intended to mean the amount of water which is driven off from a siliceous pigment by heating the pigment at ignition temperature, for example, 1000° C. to 1200° C., until no further water can be removed, minus the amount of free water in the pigment.

The amount of bound and free water in the silica herein contemplated is determined by the temperature of drying. Where the precipitated silica has been dried at a relatively low temperature, for example, 100 to 150° C., the silica contains bound water in the proportion of about 3 to 8 moles (normally about 6 moles) of $SiO_2$ per mole of bound water, and from about 2 to 10 percent of free water based upon the weight of the pigment.

In order to illustrate several methods of preparing silica having the required properties for use in this invention, the following examples are given. Unless otherwise specified, percentages are given by weight in these examples.

EXAMPLE I

Streams of aqueous sodium silicate solution containing 100 grams per liter $SiO_2$ as $Na_2O(SiO_2)_{3.36}$ and calcium chloride solution containing 100 grams per liter of $CaCl_2$ and 30 to 40 grams per liter of sodium chloride were fed directly into the central area of a centrifugal pump at 150° F.

The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus prepared was introduced into a tank and sufficient hydrochloric acid solution containing 28 percent by weight HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration and was dried in an oven at a drying temperature of 120 to 140° C. for 12 hours. The free water content of the product was within the range of 3 to 8 percent by weight of the pigment.

EXAMPLE II

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F., plus or minus 5°. Carbon dioxide gas containing 10.0 to 10.8 percent $CO_2$, the balance being nitrogen and air, is introduced into the solution at a gas temperature of 115 to 145° F. at a rate sufficient to provide 1250 cubic feet of the carbon dioxide gas per minute (measured at 760 millimeters pressure and 0° C.). This gas is introduced directly under a turbo agitator in a manner to achieve uniform distribution of gas, and the mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. The slurry is then treated with sufficient HCl to lower the pH to 7, after which the slurry is filtered and washed. The resulting silica has a surface area of 140 to 150 square meters per gram.

While specific methods of preparing desirable siliceous materials have been described, it is not intended that the invention be restricted thereto since other silica pigments having a surface area above 25 square meters per gram, such as silica produced by burning ethyl silicate or silicon tetrachloride in air or oxygen, may be used in the present invention.

The amount of siliceous pigment used in the rubber compound normally ranges from 10 to 80 parts by weight per 100 parts by weight of rubber.

The amount of sulfurized tall oil employed, such as "Fortex," may vary considerably, but usually 1.5 to about 8 parts by weight per 100 parts by weight of rubber is advantageous. Of course, these proportions of siliceous pigment and tall oil will vary considerably depending upon the type of resulting rubber composition desired.

In the practice of the present invention, the rubber, pigment, and sulfurized tall oil are milled together in a manner conventional for milling rubber stock. Other conventional components normally incorporated in Butyl rubber stocks, such as accelerators, softeners, plasticizers and the like, may be milled into the stock at the same time or subsequently. Thereafter, the milled composition is sheeted out and used in accordance with standard accepted procedures. Vulcanization of the product is effected at conventional temperatures, for example, 300 to 350° F.

The following example is illustrative of the rubber recipes contemplated in the present invention using finely-divided silica of the type hereinbefore described and sulfurized tall oil:

*Example A*

| | Compound | | |
|---|---|---|---|
| | A | B | C |
| Butyl 268 (Butyl rubber)[1] | 100 | 100 | 100 |
| Silica prepared as in Example II | 40 | 40 | 40 |
| Zinc Oxide | 5 | 5 | 5 |
| Methyl Tuads (tetramethyl thiuramdisulfide) | 2 | 2 | 2 |
| Sulfur | 1 | 1 | 1 |
| Sulfasan R (4,4'-dithiomorpholine) | 1.5 | 1.5 | 1.5 |
| Diethylene glycol | 2.5 | 2.5 | 2.5 |
| BxDC (butoxyethyl diglycol carbonate) | 1 | 1 | 1 |
| Paraffin | 0.75 | 0.75 | 0.75 |
| "FORTEX"[2] | | 2.5 | 5.0 |

[1] Non-staining form of GR-I-18 sold under name of "Butyl 268" by Enjay Company, New York, New York.
[2] Described in the January 1953 issue of Chemical Processing, page 27.

Compounds A, B and C, when tested according to standard physical tests for rubber exhibited the following properties:

TABLE I

| Compound | Minutes Cure at 320° F. | 500% Modulus | Tensile (Pounds Per Square Inch) | Elongation (Percent) | Hardness | | Tear (Pounds Per Inch) | Permanent Set at 75% of Ultimate Elongation |
|---|---|---|---|---|---|---|---|---|
| | | | | | 0" | 30" | | |
| A | 7.5 | 570 | 2,350 | 800 | 53 | 39 | 250 | |
| | 10 | 580 | 2,320 | 790 | 54 | 40 | 240 | |
| | 15 | 670 | 2,280 | 750 | 54 | 40 | 210 | |
| | 20 | 700 | 2,350 | 740 | 56 | 42 | 220 | 35 |
| | 30 | 750 | 2,290 | 710 | 53 | 42 | 170 | 32 |
| | 45 | 770 | 2,150 | 680 | 59 | 43 | 170 | 28 |
| B | 7.5 | 530 | 2,270 | 820 | 56 | 42 | 260 | |
| | 10 | 550 | 2,250 | 800 | 56 | 40 | 250 | |
| | 15 | 590 | 2,270 | 770 | 56 | 42 | 250 | 25 |
| | 20 | 620 | 2,250 | 760 | 56 | 42 | 240 | 24 |
| | 30 | 660 | 2,260 | 740 | 56 | 44 | 210 | 25 |
| | 45 | 680 | 2,150 | 740 | 56 | 45 | 200 | |
| C | 7.5 | 430 | 2,320 | 860 | 57 | 39 | 320 | |
| | 10 | 440 | 2,360 | 850 | 56 | 40 | 310 | |
| | 15 | 500 | 2,280 | 790 | 56 | 42 | 280 | 21 |
| | 20 | 530 | 2,260 | 780 | 56 | 42 | 270 | 21 |
| | 30 | 550 | 2,370 | 760 | 56 | 42 | 240 | 20 |
| | 45 | 580 | 2,160 | 740 | 56 | 42 | 240 | |

It can be noted from the above table that the practice of the present invention yields a Butyl stock having a substantially improved permanent set without impairment of other properties.

Although the present invention has been described with reference to the specific details of certain embodiments, it is not intended that such embodiment shall be regarded as limitations upon the scope of the invention except insofar as included in the accompanying claims.

I claim:

1. A vulcanizate of a rubbery copolymer of 70 to 99 percent by weight of isobutylene and 30 to 1 percent by weight of diolefin, a finely divided precipitated siliceous reinforcing pigment having an average ultimate particle size of less than 0.1 micron and a sulfurized tall oil of sticky viscous consistency in an amount of up to 8 parts by weight per 100 parts by weight of the copolymer.

2. The composition of claim 1 wherein the copolymer is a rubbery copolymer of about 97.5 parts by weight of isobutylene and 2.5 parts by weight of isoprene.

3. The method of preparing a synthetic rubber which comprises combining together a rubbery copolymer of 70 to 99 percent by weight isobutylene and 30 to 1 percent by weight of a diolefin, a precipitated finely divided siliceous reinforcing pigment having an average ultimate particle size of less than 0.1 micron and a sulfurized tall oil of sticky viscous consistency in an amount up to 8 parts by weight per 100 parts by weight of the copolymer.

4. The method of claim 3 wherein the copolymer is a rubbery copolymer of about 97.5 parts by weight of isobutylene and 2.5 parts by weight of isoprene.

5. The vulcanizate of claim 1 wherein the siliceous reinforcing pigment is finely-divided silica.

6. The vulcanizate of claim 1 wherein the siliceous reinforcing pigment is finely-divided calcium silicate.

7. The vulcanizate of claim 1 wherein the siliceous reinforcing pigment is finely-divided sodium aluminum silicate.

8. The vulcanizate of claim 1 wherein the siliceous reinforcing pigment is finely-divided sodium calcium aluminum silicate.

9. The vulcanizate of claim 1 wherein the siliceous reinforcing pigment is finely-divided aluminum silicate.

10. A vulcanizate of a rubbery copolymer of 70 to 99 percent by weight of isobutylene and 30 to 1 percent by weight of a diolefin, a precipitated finely divided siliceous reinforcing pigment having an average ultimate particle size below 0.1 micron in the proportion ranging from about 10 to 80 parts by weight per 100 parts by weight of the copolymer, and a sulfurized tall oil of sticky viscous consistency in an amount from about 1.5 to about 8 parts by weight per 100 parts by weight of the copolymer.

References Cited in the file of this patent

UNITED STATES PATENTS

| | | |
|---|---|---|
| TM581,651 | | Dec. 27, 1953 |
| 2,480,478 | Kalman | Aug. 30, 1949 |
| 2,702,286 | Iknayan et al. | Feb. 15, 1955 |

OTHER REFERENCES

Chemical Processing, p. 27, vol. 16, No. 1, January 1953, Tall Oil Dig.

McPherson, Engineering Uses in Rubber, pp. 50–51, Reinhold (1956).